US012689693B2

(12) United States Patent (10) Patent No.: US 12,689,693 B2
Schreibman et al. (45) Date of Patent: Jul. 21, 2026

(54) SPATIALLY BASED ADAPTIVE FILTER FOR A DOUBLE TALK RECOVERY METHOD

(71) Applicant: GM Global Technology Operations LLC, Detroit, MI (US)

(72) Inventors: Amos Schreibman, Hod Hasharon (IL); Elior Hadad, Ness-Ziona (IL)

(73) Assignee: GM Global Technology Operations LLC, Detroit, MI (US)

( * ) Notice: Subject to any disclaimer, the term of this patent is extended or adjusted under 35 U.S.C. 154(b) by 188 days.

(21) Appl. No.: 18/518,658

(22) Filed: Nov. 24, 2023

(65) Prior Publication Data
US 2025/0175558 A1 May 29, 2025

(51) Int. Cl.
*H04M 9/08* (2006.01)
*H04R 1/32* (2006.01)

(52) U.S. Cl.
CPC .............. *H04M 9/082* (2013.01); *H04R 1/32* (2013.01)

(58) Field of Classification Search
CPC ..................................................... H04M 9/082
USPC ..................................................... 379/406.08
See application file for complete search history.

(56) References Cited

U.S. PATENT DOCUMENTS

| | | | | |
|---|---|---|---|---|
| 9,659,576 B1 * | 5/2017 | Kotvis | ................ | G10L 21/0224 |
| 2011/0058676 A1 * | 3/2011 | Visser | ..................... | G10L 21/02 |
| | | | | 381/17 |
| 2012/0330652 A1 * | 12/2012 | Turnbull | ................. | G10L 21/02 |
| | | | | 704/226 |
| 2014/0328490 A1 * | 11/2014 | Mohammad | .......... | H04M 9/082 |
| | | | | 381/66 |

FOREIGN PATENT DOCUMENTS

| | | |
|---|---|---|
| EP | 2992668 B1 | 2/2018 |
| EP | 2244254 B1 | 6/2019 |

\* cited by examiner

*Primary Examiner* — Alexander Krzystan
(74) *Attorney, Agent, or Firm* — Honigman LLP; Matthew H. Szalach; Jonathan P. O'Brien

(57) ABSTRACT

A method when executed causes data processing hardware to perform operations including receiving a first audio signal and a second audio signal simultaneously at an adaptive filter of an acoustic echo canceler (AEC). The first audio signal corresponds to a third-party source and the second audio signal corresponds to a target source. The operations include estimating an echo signal present in the second audio signal based on the simultaneous first audio signal and the second audio signal received at the adaptive filter and estimating an echo signal directivity of the estimated echo signal, determining a target directivity of the target source, and comparing the estimated echo signal directivity with the determined target directivity. The operations include detecting a divergence of an estimated echo signal direction toward a target source direction to determine AEC divergence due to a double talk scenario and resetting the adaptive filter and the acoustic echo canceler.

13 Claims, 5 Drawing Sheets

SPATIALLY BASED ADAPTIVE FILTER FOR A DOUBLE TALK RECOVERY METHOD

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a spatially based adaptive filter for a double talk recovery method.

During phone calls or other microphone exchanges, the far end speaker may often hear an echo come through. For example, the speaker may experience hearing their own voice after speaking. Typically acoustic echo cancelers (AEC) are conventionally used as part of a speech processing chain for removing the echo. Double talk scenarios occur when a near end speaker and a far end speaker speak simultaneously. In some double talk scenarios, the AEC may cause artifacts such as desired signal cancellation, musical tones, and reverberations due to the AEC's filter convergence to the near-end signal to have an effect on the AEC output.

SUMMARY

In some aspects, a computer-implemented method when executed by data processing hardware causes the data processing hardware to perform operations including receiving a first audio signal and a second audio signal simultaneously at an adaptive filter of an acoustic echo canceler (AEC). The first audio signal corresponds to a third-party source and the second audio signal corresponds to a target source. The operations also include estimating an echo signal present in the second audio signal based on the simultaneous first audio signal and the second audio signal received at the adaptive filter and estimating an echo signal directivity of the estimated echo signal. A target directivity of the target source is determined and the estimated echo signal directivity is compared with the determined target directivity. The operations further include detecting a divergence of an estimated echo signal direction toward a target source direction to determine AEC divergence due to a double talk scenario and resetting the adaptive filter and the acoustic echo canceler.

In some examples, determining the target directivity may include retrieving the target directivity from a beamformer. Optionally, determining the target directivity may include utilizing a delay and sum model. In other examples, determining the target directivity may include training an acoustical transfer function estimations of a controller of a vehicle and utilizing geometric properties of the vehicle. In some implementations, comparing the estimated echo signal directivity and the determined target directivity may include determining a directional target-to-echo signal ratio. Determining the target-to-echo signal ratio may include determining an adaptive floor of the target-to-echo signal ratio and determining a threshold of the target-to-echo signal ratio based on the determined adaptive floor. In other implementations, detecting the divergence of the estimated echo signal direction may include detecting that a current target-to-echo signal ratio exceeds the adaptive floor of the determined directional target-to-echo signal ratio by a threshold.

In other aspects, a system includes data processing hardware and memory hardware in communication with the data processing hardware. The memory hardware stores instructions that when executed on the data processing hardware cause the data processing hardware to perform operations. The operations include receiving a first audio signal and a second audio signal simultaneously at an adaptive filter of an acoustic echo canceler (AEC). The first audio signal corresponds to a third-party source and the second audio signal corresponds to a target source. The operations include estimating an echo signal present in the second audio signal based on the simultaneous first audio signal and the second audio signal received at the adaptive filter. An echo signal directivity of the estimated echo signal is estimated, and a target directivity of the target source is determined. The estimated echo signal directivity is compared with the determined target directivity. The operations also include detecting a divergence of an estimated echo signal direction toward a target source direction to determine AEC divergence due to a double talk scenario and resetting the adaptive filter and the acoustic echo canceler.

In some examples, determining the target directivity may include retrieving the target directivity from a beamformer. Optionally, determining the target directivity may include utilizing a delay and sum model. In other examples, determining the target directivity may include training an acoustical transfer function estimations of a controller of a vehicle and utilizing geometric properties of the vehicle. In some implementations, comparing the estimated echo signal directivity and the determined target directivity may include determining a directional target-to-echo signal ratio. Determining the target-to-echo signal ratio may include determining an adaptive floor of the target-to-echo signal ratio and determining a threshold of the target-to-echo signal ratio based on the determined adaptive floor. In other implementations, detecting the divergence of the estimated echo signal direction may include detecting that a current target-to-echo signal ratio exceeds the adaptive floor of the determined directional target-to-echo signal ratio by a threshold.

In yet other aspects, a computer-implemented method for an adaptive filter system of a vehicle, when executed by data processing hardware, causes the data processing hardware to perform operations. The operations include receiving a first audio signal and a second audio signal simultaneously at an adaptive filter of an acoustic echo canceler (AEC). The first audio signal corresponds to a third-party source and the second audio signal corresponds to a target source. The operations also include estimating an echo signal present in the second audio signal based on the simultaneous first audio signal and the second audio signal received at the adaptive filter and estimating an echo signal directivity of the estimated echo signal. A target directivity of the target source is determined and compared with the estimated echo signal directivity. The operations further include determining a directional target-to-echo signal ratio including determining an adaptive floor of the target-to-echo signal ratio and detecting a divergence of the estimated echo signal direction toward a target source direction to determine AEC divergence due to a double talk scenario. The operations then include executing a counter measure of the AEC.

In some examples, determining the target directivity may include retrieving the target directivity from a beamformer. Optionally, determining the target directivity may include utilizing a delay and sum model. In other examples, determining the target directivity may include training an acoustical transfer function estimations of a controller of a vehicle and utilizing geometric properties of the vehicle. In some implementations, executing a counter measure may include resetting the adaptive filter and the AEC. Optionally, determining a directional target-to-echo signal ratio may include detecting that a current target-to-echo signal ratio exceeds the adaptive floor of the determined directional target-to-echo signal ratio by a threshold.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
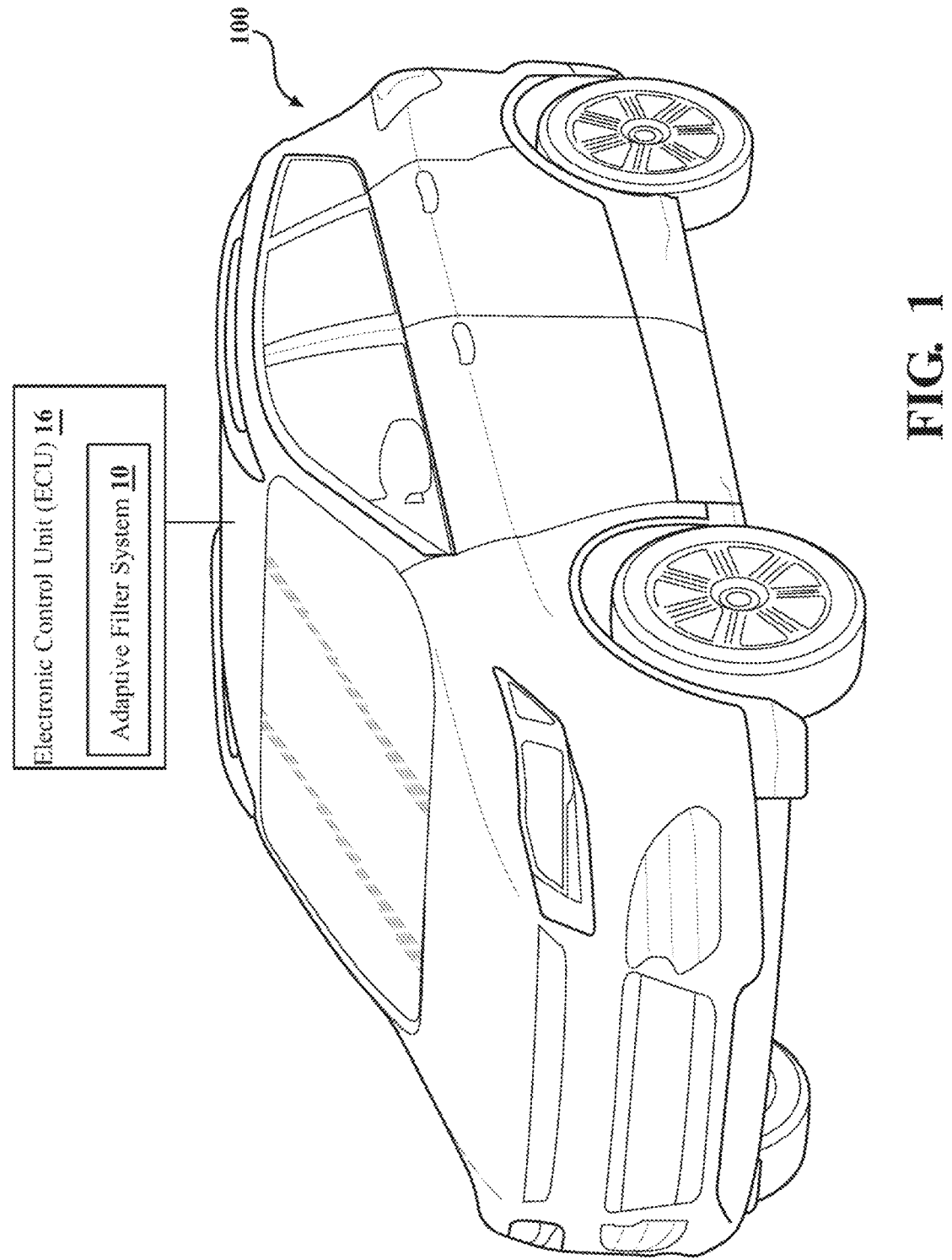
FIG. 1 is a perspective view of a vehicle according to the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
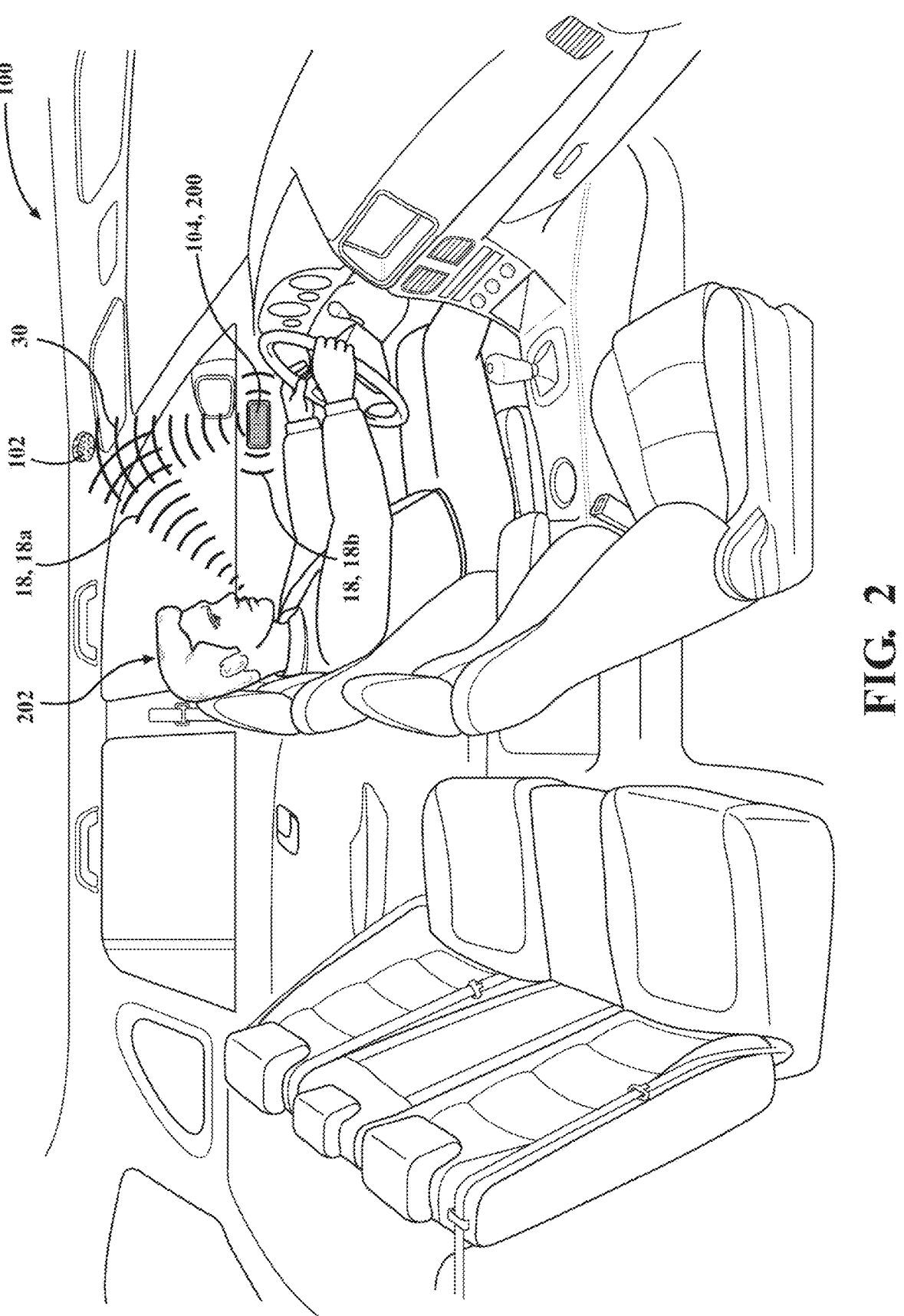
FIG. 2 is a partial perspective view of an interior cabin of a vehicle according to the present disclosure, the interior cabin including a driver speaking.
Figure 3:
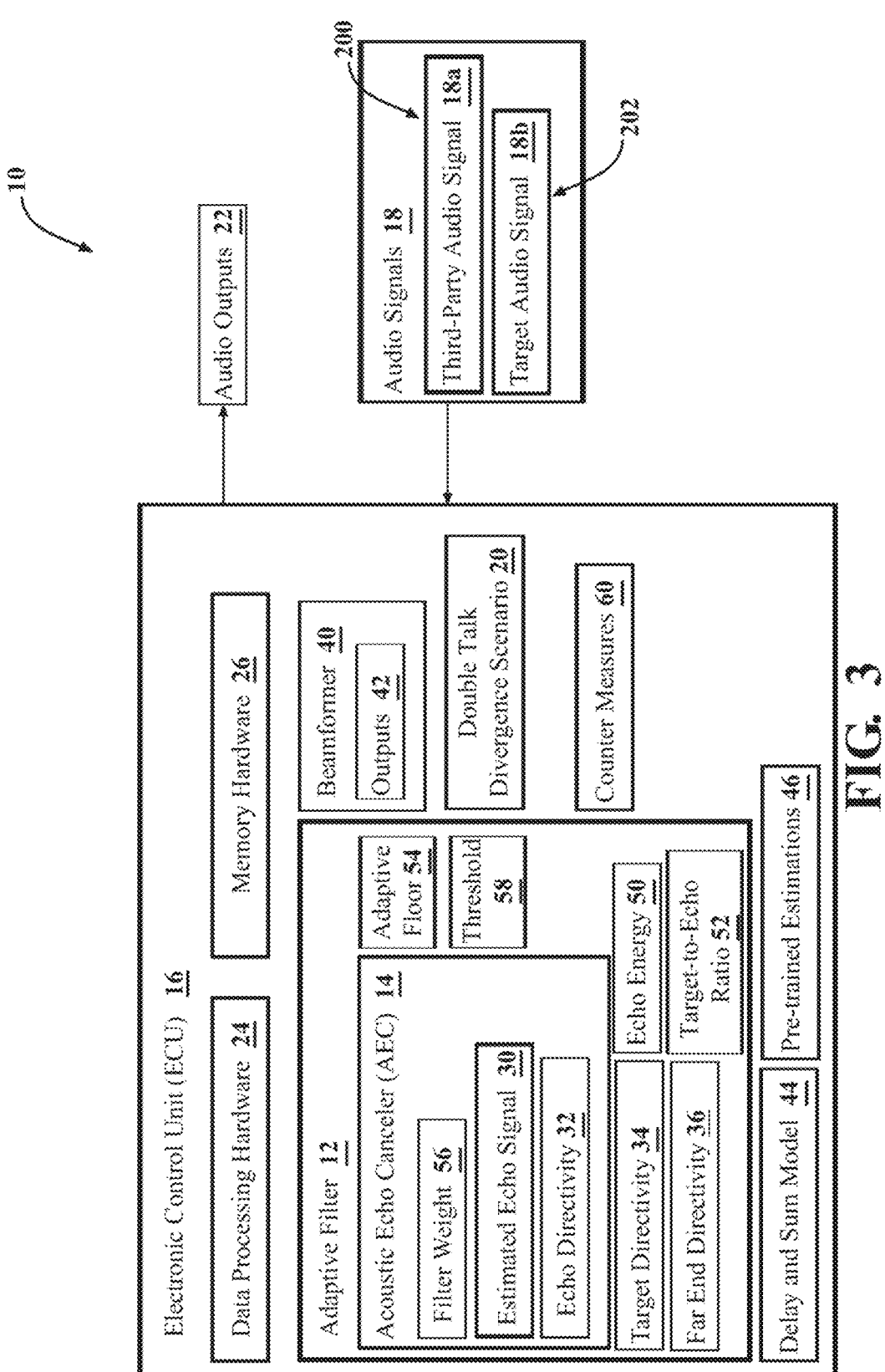
FIG. 3 is a schematic block diagram of an adaptive filter system according to the present disclosure.

Referring to FIGS. 1-3, an adaptive filter system 10 according to the present disclosure for a vehicle 100 includes an adaptive filter 12 of an acoustic echo canceler (AEC) 14. The adaptive filter system 10 may be configured as part of an electronic control unit (ECU) 16 of the vehicle 100. It is also contemplated that in other examples, the adaptive filter system 10 may be utilized in computer systems other than with respect to a vehicle. Such examples include, but are not limited to, mobile devices, headsets, earphones, speaker systems, and any other practicable device utilizing voice-to-voice and/or voice-to-machine (ASR) communication via an audio system. The adaptive filter system 10 is described herein with respect to the vehicle 100 for exemplary purposes.

The adaptive filter system 10 may be electrically coupled to a sensor array 102 of the vehicle 100 to receive audio signals 18. In some examples, the sensor array 102 may include a microphone array within the vehicle 100 configured to capture, at least in part, the audio signals 18. The audio signals 18 include a third-party audio signal 18a and a target audio signal 18b, with the third-party audio signal 18a emanating from a third-party source 200 and the target audio signal 18b emanating from a target source 202. For example, the target source 202 may be an occupant of the vehicle 100, depicted in FIG. 2 as a driver of the vehicle 100, and the third-party source 200 may be, in one example, a loudspeaker system 104 within the vehicle 100.

The adaptive filter system 10 receives the audio signals 18 from the sensor array 102 and monitors the audio signals 18 for potential AEC adaptation during simultaneous overlap of the audio signals 18. For example, the third-party source 200 and the target source 202 may speak simultaneously, such that the sensor array 102 receives the third-party audio signal 18a and the target audio signal 18b simultaneously. In other examples, the audio signals 18 are received sequentially, such that the audio signals 18 are free from overlap. The adaptive filter system 10 is configured to detect adaptation during an overlap of the audio signals 18 based on a directivity of the respective audio signals 18. For example, the third-party source 200 and the target source 202 inherently have a different location relative to one another. Thus, if the adaptive filter system 10 detects the audio signals 18 emanating from a common direction, then a double talk divergence scenario 20 is detected, as described in more detail below.

Referring still to FIGS. 1-3, the adaptive filter system 10 coordinates the ECU 16 with the adaptive filter 12 and the AEC 14 to monitor the audio signals 18 and adjust an audio output 22 from the adaptive filter system 10. The ECU 16 includes data processing hardware 24 and memory hardware 26 that may store instructions and operations of the adaptive filter system 10 that may be executed by the data processing hardware 24. In some examples, the adaptive filter 12 and the AEC 14 may be configured as part of the ECU 16. In other examples, the adaptive filter 12 and the AEC 14 are separate from the ECU 16 and are in communication with the ECU 16.

The adaptive filter system 10 is configured to detect the double talk divergence scenario 20. In operation, the AEC 14 converges toward the third party audio signal 18a. The convergence of the AEC 14 is configured to remove the echo caused by the coupling between the loudspeaker system 104 and the microphone array 102 within the vehicle 100. The convergence of the AEC 14 may trigger the adaptive filter 12 to estimate an echo signal 30 present in the target audio signal 18b. The echo signal 30 may come from the loudspeaker system 104 of the vehicle 100. For example, the AEC 14 may receive the target signal 18b and the third-party signal 18a simultaneously, and the adaptive filter 12 may estimate the echo signal 30 based on the simultaneously received audio signals 18. The echo signal 30 may be estimated based on the potential simultaneous detection of the target audio signal 18b and the third-party audio signal 18a, which can cause the adaptive filter 12 to diverge from the estimated echo signal 30 toward the target signal 18b. The echo signal 30 may be detected by the sensor array 102 and may result in feedback to the third party speaker 200. For example, the third party speaker 200 may hear an echo, via the cancelled echo signal 30a, emanating as feedback from the loudspeaker system 104. This may result when the audio signals 18 seem to emanate from a similar direction as the target speaker 202. The audio signals 18 should instead emanate from different directions, as the third-party source 200 (i.e., the loudspeaker system 104) and the target source 202 locations are inherently different.

Figure 4:
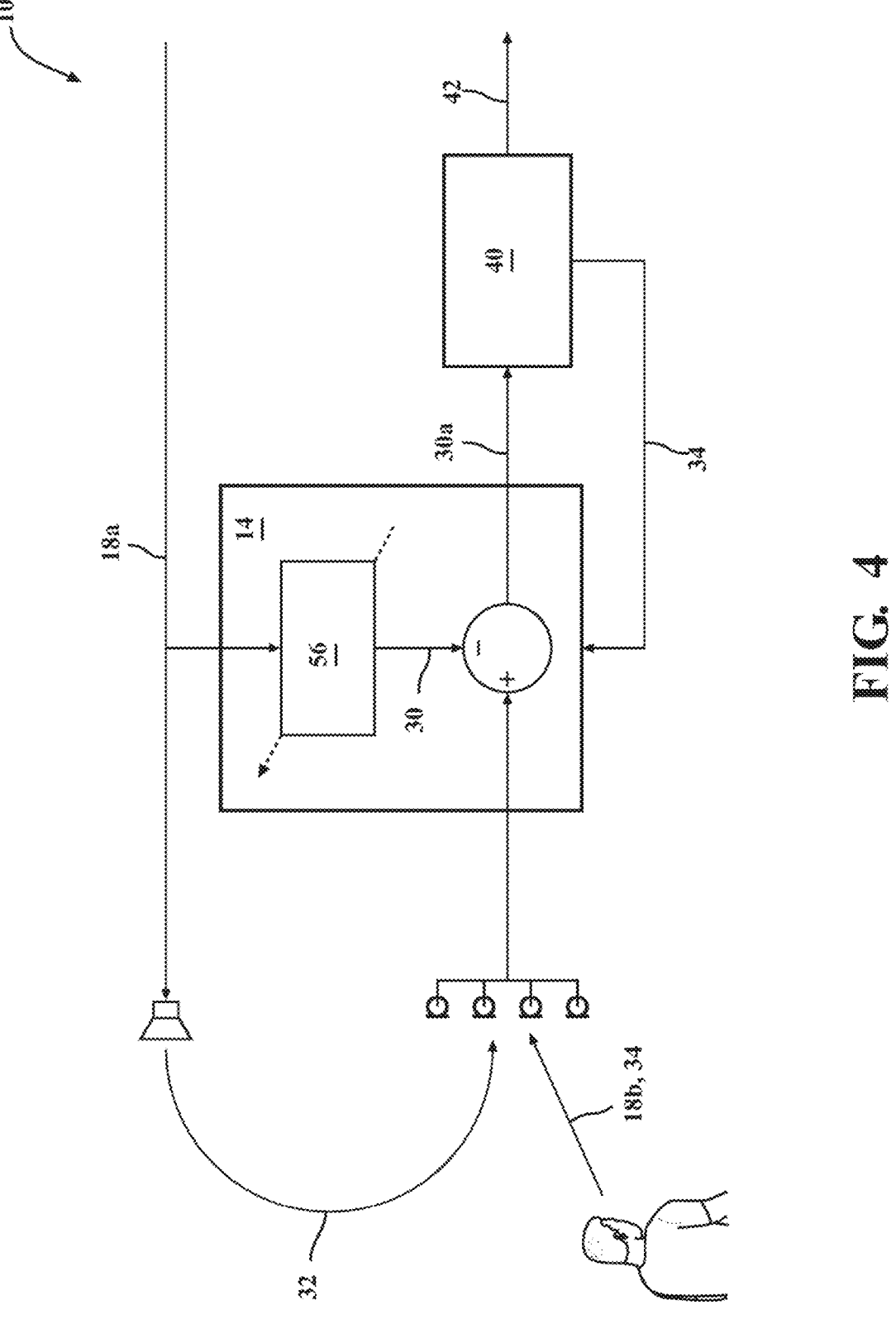
FIG. 4 is an example schematic diagram of an adaptive filter system and a double talk scenario according to the present disclosure.

With reference now to FIGS. 2-4, the adaptive filter 12 may estimate an echo directivity 32 of the estimated echo signal 30 and may also determine a target directivity 34 of the target source 202 and/or the target audio signal 18b. As described herein, the third-party source 200 generally corresponds to a third-party speaker exterior to the vehicle 100 and emanating the third-party signal 18a via the loudspeaker system 104. In one example, the third-party source 200 may be a person speaking with the target source 202 over a phone system of the vehicle 100, which uses the sensor array 102 and the loudspeaker system 104. Thus, while the third-party sources 200 is referred to as the loudspeaker system 104, in other examples the third-party source 200 may be different from the loudspeaker system 104. It is contemplated that the directivity 34 of the target audio signal 18b and the target directivity 34 of the target source 202 are synonymous. Stated differently, the target directivity 34 may refer to the target directivity 34 of either of the target source 202 and the target audio signal 18b. In some examples, the audio signal 18 emanating from the loudspeaker system 104 may also include a directivity 36, referred to as the far end directivity 36. As described below, the far end directivity 36 corresponds to the audio signals 18 from the loudspeaker system 104 that are estimated to be an echo signal 30.

The directivity 32, 34 of the estimated echo signal 30 and the target audio signal 18b may be utilized in detecting the double talk divergence scenario 20. For example, the AEC 14 may detect the presence of the double talk divergence scenario 20 based on the convergence of the echo directivity 32 and the target directivity 34. The double talk divergence scenario 20 may correspond with divergence of the AEC 14. The double talk divergence scenario 20 is defined by the overlap of the target signal 18b and the third-party signal 18a, which results in the echo signal 30. The overlap of the signals 18a, 18b is determined by the respective directivities 34, 36, which may be utilized in combination with the echo directivity 32.

The target directivity 34 may be determined using a variety of methods. In one example, the target directivity 34 may be identified by a beamformer 40 of the adaptive filter system 10. The beamformer 40 may be utilized in various audio filtration mechanisms of the adaptive filter system 10 and produces outputs 42 as a result. The beamformer 40 is utilized to extract the target signal 18b to calculate the target directivity 34. In some examples, the beamformer 40 may include useful knowledge from which the target directivity 34 can be calculated. In other examples, the outputs 42 may include additional data that may be utilized by the adaptive filter 12 to determine the target directivity 34 from the beamformer 40.

In another example, the target directivity 34 may be determined by a delay and sum model 44. The delay and sum model 44 is a beamforming algorithm that may be programmed into the memory hardware 26 of the ECU 16. In executing the delay and sum model 44, the audio signals 18 are delayed by a predetermined amount of time before adding or summation. In yet another example, the target directivity 34 may be determined using pre-trained acoustical transfer function estimations (pre-trained estimations) 46. The pre-trained estimations 46 may be provided by system identification utilizing geometric properties of the vehicle 100. Any one of the methods described herein may be utilized to determine the target directivity 34.

Referring still to FIGS. 2-4, the adaptive filter 12 may further estimate an echo energy 50 relative to the target source 202, once the target directivity 34 is determined. For example, the estimated echo energy 50 relative to the target directivity 34 may be calculated using the following example equation:

$$ENG_{src} = \left| y^H h \right|^2$$

Where ($ENG_{src}$) represents the estimated echo energy 50, (y) represents the estimated echo signal 30, and (h) represents the target directivity 34. After estimating the echo energy 50, the adaptive filter 12 may determine a directional target-to-echo signal ratio 52. For example, the estimated echo directivity 32 and the target directivity 34 can be compared to determine the target-to-echo signal ratio 52.

For example, the adaptive filter 12 may determine the directional target-to-echo signal ratio 52 when comparing the echo directivity 32 and the target directivity 34. The adaptive filter system 10 is configured to clean, minimize, or otherwise eliminate the estimated echo signal 30. The estimated echo signal 30 may be determined based on the loudspeaker system 104 and the target speaker 202. By assessing the target directivity 34, the adaptive filter system 10 can learn a potential reaction between the loudspeaker system 104 and the target speaker 202 that may provide an indication of the estimated echo signal 30. Although the sensor array 102 is configured to detect the audio signals 18 from the third-party source 200 and the target speaker 202, it is contemplated that the sensor array 102 may receive feedback from the loudspeaker system 104 corresponding to the estimated echo signal 30.

The directional target-to-echo signal ratio 52 may be calculated using the following example equation:

$$DUR = \frac{ENG_{src}}{y^H y - ENG_{src}}$$

where (DUR) represents the directional target-to-echo signal ratio 52. The adaptive filter 12 may utilize recursive averaging of the directional target-to-echo signal ratio 52 to determine an adaptive floor 54 of the target-to-echo signal ratio 52. The adaptive floor 54 is produced when the target audio signal 18*b* is absent from the target-to-echo signal ratio 52. The adaptive floor 54 may be calculated using the following example equation:

$$DUR_{floor}(n) = \lambda DUR_{floor}(n-1) + (1-\lambda)DUR(n-1)$$

where (n) is a current time frame and ($\lambda$) is an averaging constant. The adaptive floor 54 reflects a nominal correlation with the target directivity 34.

It is contemplated that the adaptive floor 54 is an adaptive value that is continuously adapted based on the data gathered by the adaptive filter system 10. For example, the adaptive floor 54 is a data driven value that changes slowly over time based on the target directivity 34 and the echo directivity 32 that is continuously changing throughout various sessions. Thus, the adaptive floor 54 is a dynamic value. The adaptive filter 12 includes a filter weight 56 that may be adjusted to mimic the far end directivity 36. The adaptive filter system 10 may detect an error, as an estimated echo signal 30 or echo directivity 32, when the filter weight 56 mimics the target directivity 34. Thus, the adaptive filter 12 should be adjusted, as described below, to mimic the far end directivity 36.

With further reference to FIGS. 2-4, the adaptive filter 12 may further determine a threshold 58 of the target-to-echo signal ratio 52. For example, the threshold 58 can be determined based on the adaptive floor 54. The adaptive floor 54 may be utilized in determining the directional target-to-echo signal ratio 52 by detecting that a current target-to-echo signal ratio exceeds the adaptive floor 54 by the threshold 58. The threshold 58 provides a metric by which the adaptive filter system 10 may determine that the echo directivity 32 has shifted toward the target directivity 34. The threshold 58 may be calculated using the following example equation:

$$\frac{DUR(n)}{DUR_{floor}(n)} > thr$$

The threshold 58 is determined based on a ratio of the target-to-echo ratio 52, represented by (DUR(n)) and the adaptive floor 54, represented by ($DUR_{floor}(n)$). The threshold 58 is designed to be less than the ratio between the target-to-echo ratio 52 and the adaptive floor 54. The adaptive floor 54 is configured to reflect a nominal correlation with the target directivity 34. Thus, when the target-to-echo ratio 52 exceeds the adaptive floor 54, then it can be assumed that the echo directivity 32 has shifted toward the target source 202.

The adaptive filter system 10 monitors the echo directivity 32 and the target directivity 34 to consistently monitor, via calculations, the relationship between the third-party signal 18*a* and the target signal 18*b*. Thus, the adaptive filter 10 is continuously adapting based on new signal data received by the sensor array 102. The adaptive filter 10 does not adapt when there are no audio signals detected and will begin new calculations once a third-party, far end speaker 200 begins speaking again. Thus, if the adaptive filter 12 is mistakenly adapted when the target speaker 202 is active, then the adaptive filter system 10 may detect the mistaken adaptation. Upon detection of the audio signals 18, the adaptive filter system 10 executes the above calculations to compare the two audio signals 18*a*, 18*b*. The adaptive filter system 10 may detect the double talk divergence scenario 20 and may, thus, determine an AEC divergence due to the double talk scenario 20.

In response to the echo directivity 32 shifting toward the target source 202, the adaptive filter system 10 may execute a counter measure 60. The counter measure 60 may be performed by the AEC 14. In some examples, the counter measure 60 may include resetting the adaptive filter 12. In other examples, the counter measure 60 may include reverting the adaptive filter 12 to an adaptive filter 12 that is free from the double talk divergence scenario 20.

Figure 5:
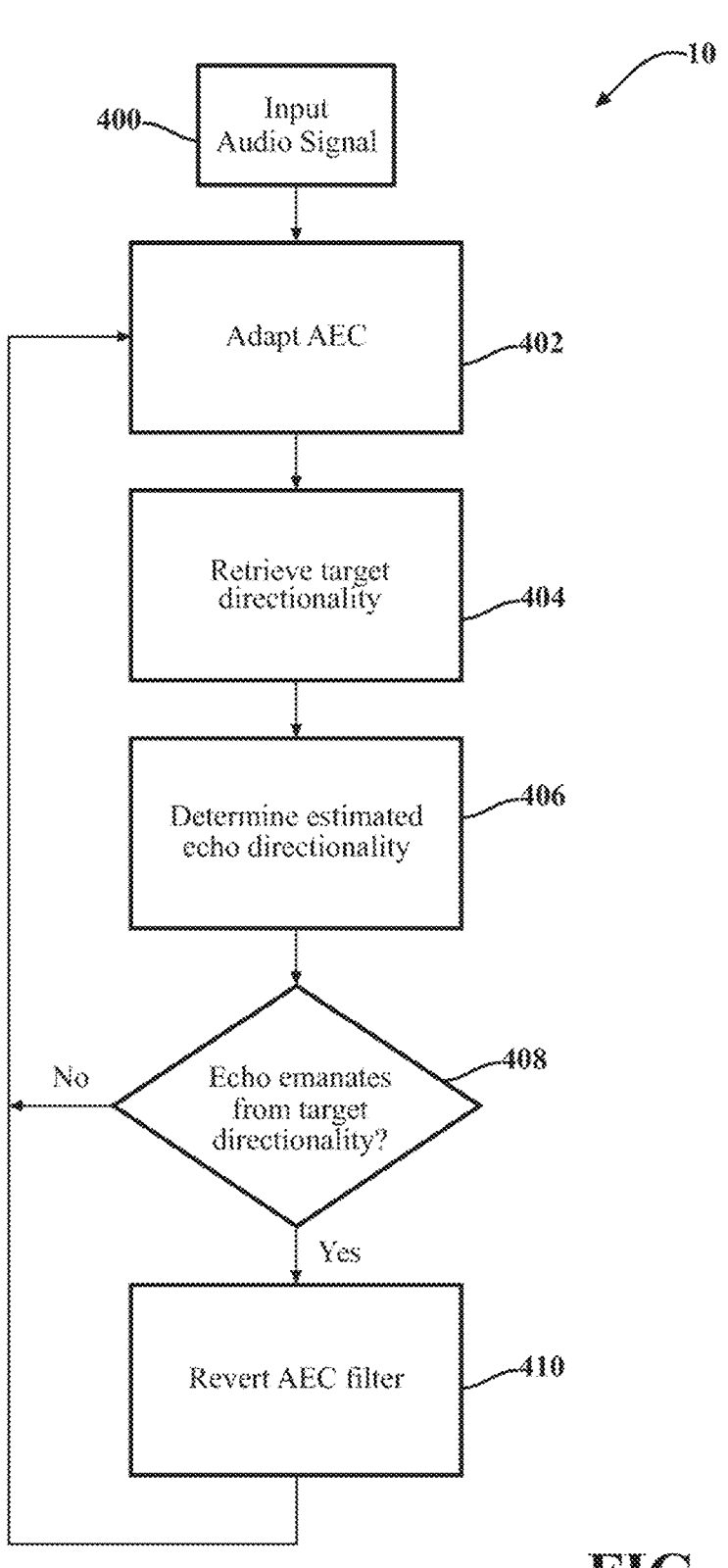
FIG. 5 is an example flow diagram for an adaptive filter system according to the present disclosure.

With specific reference to FIG. 5, an example flow diagram for the adaptive filter system 10 is illustrated. At 400, the adaptive filter system 10 receives an audio signal 18, which is subsequently received and processed, at 402, by the AEC 14. The adaptive filter system 10, at 404, determines the target directivity 34 and, at 406, determines the echo directivity 32. The adaptive filter system 10, at 408, determines whether the estimated echo signal 30 is emanating from the target directivity 34 by comparing the target directivity 34 with the echo directivity 32. If the estimated echo signal 30 is not emanating from the target directivity 34, then the adaptive filter system 10 continues to repeat the process for future audio signals 18. If the estimated echo signal 30 is emanating or tracks with the target directivity 34, then the adaptive filter system 10, at 410, executes a counter measure 60. The adaptive filter system 10 may then continuously run the flow to monitor the audio signals 18 received by the system 10.

Referring again to FIGS. 1-5, the adaptive filter system 10 is configured to minimize and/or eliminate the double talk divergence scenario 20 during operation of the adaptive filter system 10. By monitoring the target directivity 34 and comparing the echo directivity 32 with the target directivity 34, the adaptive filter 12 and AEC 14 can control for an estimated echo signal 30. Thus, a third party speaker 200 receives minimal to no double talk feedback while speaking with the target speaker 202. As a result, the user experience by the third party speaker 200 is improved by reducing the echo signal 30 and continuously adapting the adaptive filter 12 using the AEC 14 and the estimated echo signal 30.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:

receiving a first audio signal and a second audio signal simultaneously at an adaptive filter of an acoustic echo canceler (AEC), the first audio signal corresponding to a third-party source and the second audio signal corresponding to a target source;

estimating an echo signal present in the second audio signal based on the simultaneous first audio signal and the second audio signal received at the adaptive filter;

estimating an echo signal directivity of the estimated echo signal;

determining a target directivity of the target source;

determining a directional target-to-echo signal ratio based on the estimated echo signal directivity and the determined target directivity;

determining an adaptive floor of the directional target-to-echo signal ratio utilizing recursive averaging;

comparing the estimated echo signal directivity with the determined target directivity;

detecting that a current target-to-echo signal ratio exceeds the adaptive floor by a threshold;

detecting a divergence of an estimated echo signal direction toward a target source direction based on the detected threshold exceedance to determine AEC divergence due to a double talk scenario; and resetting the adaptive filter of the AEC.

2. The method of claim 1, wherein determining the target directivity includes retrieving the target directivity from a beamformer.

3. The method of claim 1, wherein determining a target directivity includes utilizing a delay and sum model.

4. The method of claim 1, wherein determining a target directivity includes training acoustical transfer function estimations of a controller of a vehicle and utilizing geometric properties of the vehicle.

5. A system comprising:

data processing hardware; and memory hardware in communication with the data processing hardware, the memory hardware storing instructions that when executed on the data processing hardware cause the data processing hardware to perform operations comprising:

receiving a first audio signal and a second audio signal simultaneously at an adaptive filter of an acoustic echo canceler (AEC), the first audio signal corresponding to a third-party source and the second audio signal corresponding to a target source;

estimating an echo signal present in the second audio signal based on the simultaneous first audio signal and the second audio signal received at the adaptive filter;

estimating an echo signal directivity of the estimated echo signal;

determining a target directivity of the target source;

determining a directional target-to-echo signal ratio based on the estimated echo signal directivity and the determined target directivity;

determining an adaptive floor of the directional target-to-echo signal ratio utilizing recursive averaging;

comparing the estimated echo signal directivity with the determined target directivity;

detecting that a current target-to-echo signal ratio exceeds the adaptive floor by a threshold;

detecting a divergence of an estimated echo signal direction toward a target source direction based on the detected threshold exceedance to determine AEC divergence due to a double talk scenario; and resetting the adaptive filter of the AEC.

6. The system of claim 5, wherein determining the target directivity includes retrieving the target directivity from a beamformer.

7. The system of claim 5, wherein determining a target directivity includes utilizing a delay and sum model.

8. The system of claim 5, wherein determining a target directivity includes training acoustical transfer function estimations of a controller of a vehicle and utilizing geometric properties of the vehicle.

9. A computer-implemented method for an adaptive filter system of a vehicle, the method when executed by data processing hardware causes the data processing hardware to perform operations comprising:

receiving a first audio signal and a second audio signal simultaneously at an adaptive filter of an acoustic echo canceler (AEC), the first audio signal corresponding to a third-party source and the second audio signal corresponding to a target source;

estimating an echo signal present in the second audio signal based on the simultaneous first audio signal and the second audio signal received at the adaptive filter;

estimating an echo signal directivity of the estimated echo signal;

determining a target directivity of the target source;

determining a directional target-to-echo signal ratio based on the estimated echo signal directivity and the determined target directivity;

determining an adaptive floor of the directional target-to-echo signal ratio utilizing recursive averaging;

comparing the estimated echo signal directivity with the determined target directivity;

detecting that a current target-to-echo signal ratio exceeds the adaptive floor by a threshold;

detecting a divergence of an estimated echo signal direction toward a target source direction based on the detected threshold exceedance to determine AEC divergence due to a double talk scenario; and executing a counter measure of the AEC.

10. The method of claim 9, wherein determining the target directivity includes retrieving the target directivity from a beamformer.

11. The method of claim 9, wherein determining a target directivity includes utilizing a delay and sum model.

12. The method of claim 9, wherein determining a target directivity includes training acoustical transfer function estimations of a controller of a vehicle and utilizing geometric properties of the vehicle.

13. The method of claim 9, wherein executing a counter measure includes resetting the adaptive filter of the AEC.

* * * * *